United States Patent
Liu et al.

(10) Patent No.: US 11,343,116 B2
(45) Date of Patent: May 24, 2022

(54) METHOD AND SYSTEM FOR DETECTING AND DEFENDING AGAINST ABNORMAL TRAFFIC OF IN-VEHICLE NETWORK BASED ON INFORMATION ENTROPY

(71) Applicants: Shanghai Trusted Industrial Control Platform Co., Ltd., Shanghai (CN); East China Normal University, Shanghai (CN)

(72) Inventors: Hong Liu, Shanghai (CN); Wei Lu, Shanghai (CN); Geguang Pu, Shanghai (CN)

(73) Assignees: Shanghai Trusted Industrial Control Platform Co., Ltd., Shanghai (CN); East China Normal University, Shanghai (CN)

( * ) Notice: Subject to any disclaimer, the term of this patent is extended or adjusted under 35 U.S.C. 154(b) by 0 days.

(21) Appl. No.: 17/188,626

(22) Filed: Mar. 1, 2021

(65) Prior Publication Data

US 2022/0006666 A1  Jan. 6, 2022

(30) Foreign Application Priority Data

Jul. 2, 2020 (CN) .......................... 202010624683.3

(51) Int. Cl.
*H04L 12/40* (2006.01)
*H04L 43/0894* (2022.01)

(52) U.S. Cl.
CPC .......... *H04L 12/40* (2013.01); *H04L 43/0894* (2013.01); *H04L 2012/40215* (2013.01); *H04L 2012/40273* (2013.01)

(58) Field of Classification Search
CPC ................. H04L 12/40; H04L 43/0894; H04L 2012/40215; H04L 2012/40273
See application file for complete search history.

(56) References Cited

U.S. PATENT DOCUMENTS

| | | | |
|---|---|---|---|
| 7,712,134 B1* | 5/2010 | Nucci ................... | H04L 63/145 726/23 |
| 2015/0148040 A1* | 5/2015 | Ehrlich ........... | H04W 36/00835 455/436 |
| 2016/0018345 A1* | 1/2016 | Park .................... | G01R 31/3648 702/63 |
| 2017/0195090 A1* | 7/2017 | Boidol ............... | G06K 9/00496 |
| 2018/0189587 A1* | 7/2018 | Mandal .............. | G06K 9/00973 |
| 2019/0230113 A1* | 7/2019 | Al Faruque ............. | G06F 21/10 |
| 2019/0258251 A1* | 8/2019 | Ditty .................. | G06K 9/00805 |
| 2020/0053104 A1* | 2/2020 | El-Moussa ............. | G06N 3/084 |

\* cited by examiner

*Primary Examiner* — Christine Ng
(74) *Attorney, Agent, or Firm* — Myers Wolin, LLC.

(57) ABSTRACT

A method for detecting and defending against abnormal traffic of an in-vehicle network based on information entropy, including the following steps: step 1: setting a sliding window; step 2: setting a threshold; step 3: collecting and processing traffic; step 4: calculating information entropy in the sliding window when the window is full; and step 5: detecting traffic of a controller area network (CAN) bus and an in-vehicle Ethernet. Based on impact of abnormal traffic on the information entropy, the information entropy in the sliding window is calculated in real time and compared with the preset thresholds, to detect whether an abnormality occurs.

5 Claims, 2 Drawing Sheets

METHOD AND SYSTEM FOR DETECTING AND DEFENDING AGAINST ABNORMAL TRAFFIC OF IN-VEHICLE NETWORK BASED ON INFORMATION ENTROPY

CROSS REFERENCE TO RELATED APPLICATION

This U.S. patent application claims foreign priority to Chinese Patent Application No. 202010624683.3, filed on Jul. 2, 2020, the contents of which are herein incorporated by reference.

TECHNICAL FIELD

The present disclosure relates to the technical field of intrusion detection, and in particular, to a method and system for detecting and defending against abnormal traffic of an in-vehicle network based on information entropy.

BACKGROUND

In recent years, supported by new technologies such as big data, edge computing, and machine learning, intelligent transportation is developing rapidly, and an era of autonomous driving is coming. However, before autonomous driving is widely applied, its safety has attracted much attention. An autonomous vehicle needs to exchange information with devices inside and outside the vehicle in real time through networking, to provide an autonomous driving service. However, the networking enlarges a communication range of the vehicle, and this provides more interfaces for attackers to attack the vehicle. An attack on the vehicle causes a serious consequence and even endangers lives of passengers. Therefore, it is of great significance to study an effective security protection mechanism to ensure in-vehicle information security of the autonomous vehicle. In a development process of today's transportation industry, more vehicle manufacturers and researchers pay attention to research of in-vehicle information security. A hot topic in recent years is to use an intrusion detection technology in an in-vehicle network.

Through investigation and survey, it is found that there is a kind of statistics-based scheme in a traditional abnormality-based intrusion detection technology. In this scheme, a method based on an entropy theory can effectively detect abnormal traffic of a traditional network. In addition, the method has high detection efficiency and appropriate computational cost, and can be used to detect abnormal traffic of the in-vehicle network in an autonomous driving scenario.

SUMMARY

Based on the foregoing description, the present disclosure provides a method for detecting and defending against abnormal traffic of an in-vehicle network based on information entropy. In this method, a detection threshold and a sliding window with a fixed size are set, information entropy is calculated for traffic in the sliding window, and a calculated entropy value is compared with the threshold to determine whether an abnormality occurs.

In the present disclosure, different objects are used as discrete random variables for traffic of a controller area network (CAN) bus and an in-vehicle Ethernet. When there is abnormal traffic on an in-vehicle network, probability distribution of these random variables is changed, resulting in a sharp decrease in the value of the information entropy. The threshold is set to determine whether the information entropy is within a reasonable range, thereby implementing abnormality detection for network traffic.

In the present disclosure, the method for performing abnormality detection on internal network traffic of a vehicle in an autonomous driving scenario based on information entropy by using a threshold is specifically implemented according to the following steps.

Step 1: Set the sliding window. A setting rule is as follows:

Step 1.1: Set a maximum tolerable time delay maxTime of abnormality detection, and calculate a traffic rate v, where a size range of the sliding window is $$\left[0, \frac{maxTime}{v}\right],$$

the sliding window needs to be set as large as possible in this range, and the fixed window size is W.

Step 1.2: Set a window sliding distance to W/2.

Step 2: Set the threshold. Specific steps are as follows:

Step 2.1: For the CAN bus, calculate information entropy $CANEntropy_1$, $CANEntropy_2$, ..., and $CANEntropy_n$ in the sliding window under normal traffic for multiple times, and set a minimum value among them as the threshold, namely, $CANThresh=\min\{CANEntropy_1, CANEntropy_2, \ldots, CANEntropy_n\}$.

Step 2.2: For the in-vehicle Ethernet, calculate information entropy $EtherEntropy_1$, $EtherEntropy_2$, ..., and $EtherEntropy_n$ in the sliding window under the normal traffic for multiple times, and set a minimum value among them as the threshold, namely, $EtherThresh=\min\{EtherEntropy_1, EtherEntropy_2, \ldots, EtherEntropy_n\}$.

Step 3: Collect and process traffic. Specific steps are as follows:

Step 3.1: Collect the traffic and add it to the sliding window.

Step 3.2: For the CAN bus, select a packet identifier ID in the window as a discrete random variable, extract the identifier ID in the window to obtain a value range $\{id_1, id_2, \ldots id_n\}$ of the variable, and take statistics on a count $Count(id_i)$ of an identifier $id_i$ ($1 \leq i \leq n$) appearing in the window.

Step 3.3: For the in-vehicle Ethernet, select a packet protocol type TYPE in the window as a discrete random variable, extract the packet protocol type TYPE in the window to obtain a value range $\{type_1, type_2, \ldots, type_n\}$ of the variable, and take statistics on a count $Count(type_i)$ of a protocol type $type_i$ ($1 \leq i \leq n$) appearing in the window.

Step 4: Calculate the information entropy in the sliding window when the window is full. Specific steps are as follows:

Step 4.1: For the CAN bus, calculate a sampling probability $p_i$ of the packet identifier $id_i$ ($1 \leq i \leq n$) in the window, where $p_i=P\{X=id_i\}=Count(id_i)/W$, and further calculate the information entropy $CANTestEntropy=-\Sigma_{i=1}^{n} p_i \log p_i$.

Step 4.2: For the in-vehicle Ethernet, calculate a sampling probability $p_i$ of the packet protocol type $type_i$ ($1 \leq i \leq n$) in the window, where $p_i=P\{X=type_i\}=Count(type_i)/W$; and further calculate the information entropy $EtherTestEntropy=-\Sigma_{i=1}^{n} p_i \log p_i$.

Step 5: Detect the traffic of the CAN bus and the in-vehicle Ethernet based on the thresholds. Specific steps are as follows:

Step 5.1: For the CAN bus, when $CANTestEntropy<CANThresh$, mark an index of a current window, send an alarm, and slide the window by the distance of W/2 to continue the detection; otherwise, directly slide the window by the distance of W/2 to continue the detection.

Step 5.2: For the in-vehicle Ethernet, when EtherTestEntropy<EtherThresh, mark the index of the current window, send an alarm, and slide the window by the distance of W/2 to continue the detection; otherwise, directly slide the window by the distance of W/2 to continue the detection.

Up to now, the method for performing abnormality detection on internal network traffic of a vehicle in an autonomous driving scenario based on information entropy by using a threshold is performed completely.

Based on the foregoing method, the present disclosure further provides a system for detecting and defending against abnormal traffic of an in-vehicle network based on information entropy, including:

a traffic collection module, configured to add traffic of an in-vehicle network to a sliding window; and a traffic analysis module, configured to calculate information entropy in the sliding window and determine whether an abnormality occurs.

In the present disclosure, the threshold and the sliding window with the fixed size are set, the information entropy is calculated for the traffic in the window, and then the calculated entropy value is compared with the threshold. If the entropy value is less than threshold, it indicates that abnormal traffic exists in the window. The method for detecting and defending against abnormal traffic of an in-vehicle network based on information entropy in the present disclosure can be embedded into a vehicle gateway. The gateway executes abnormality detection to effectively defend against an attack on the in-vehicle network.

DETAILED DESCRIPTION

Figure 1:
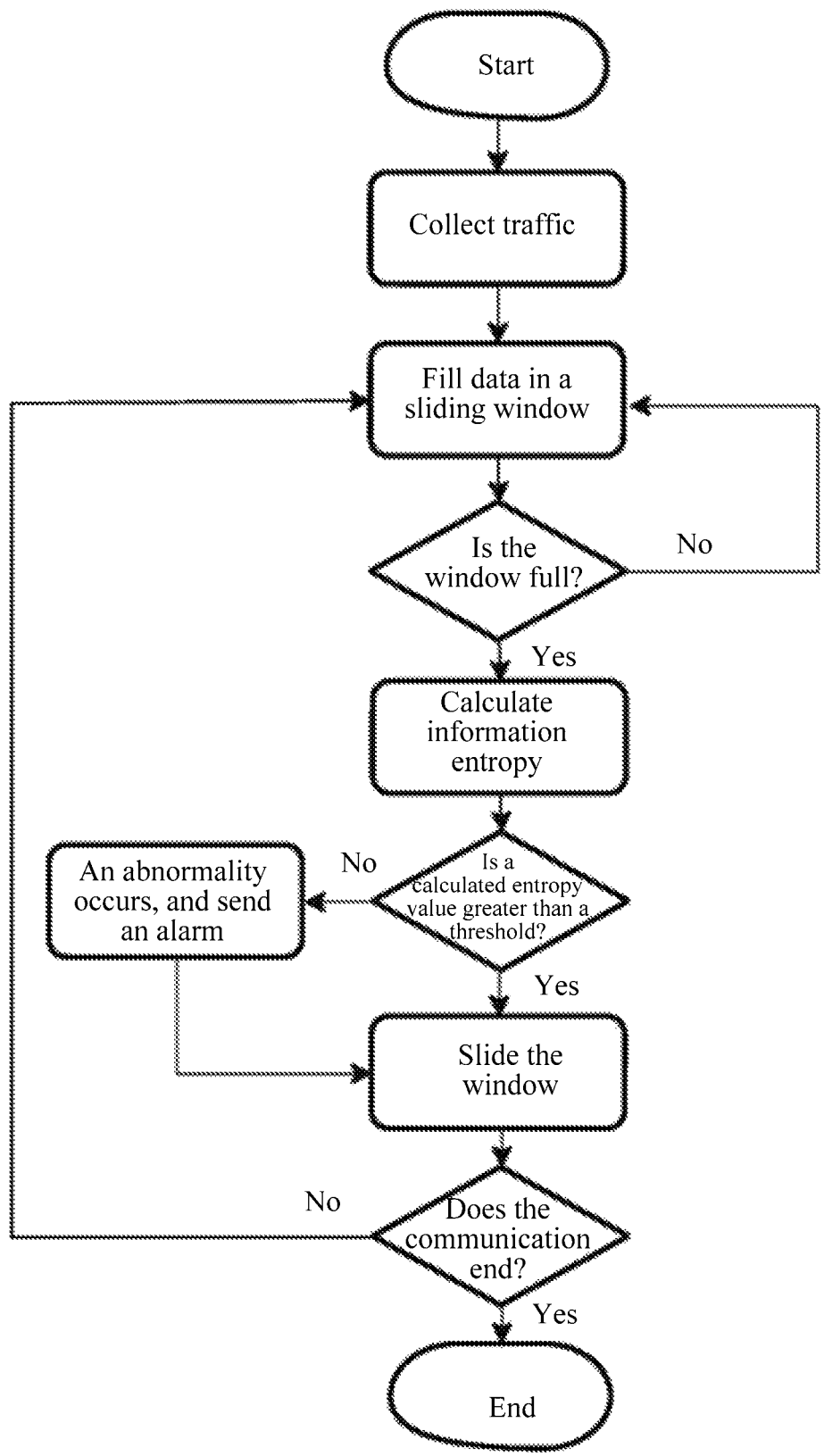
FIG. 1 is a schematic diagram of a detection process of a method for detecting and defending against abnormal traffic of an in-vehicle network based on information entropy according to the present disclosure.
Figure 2:
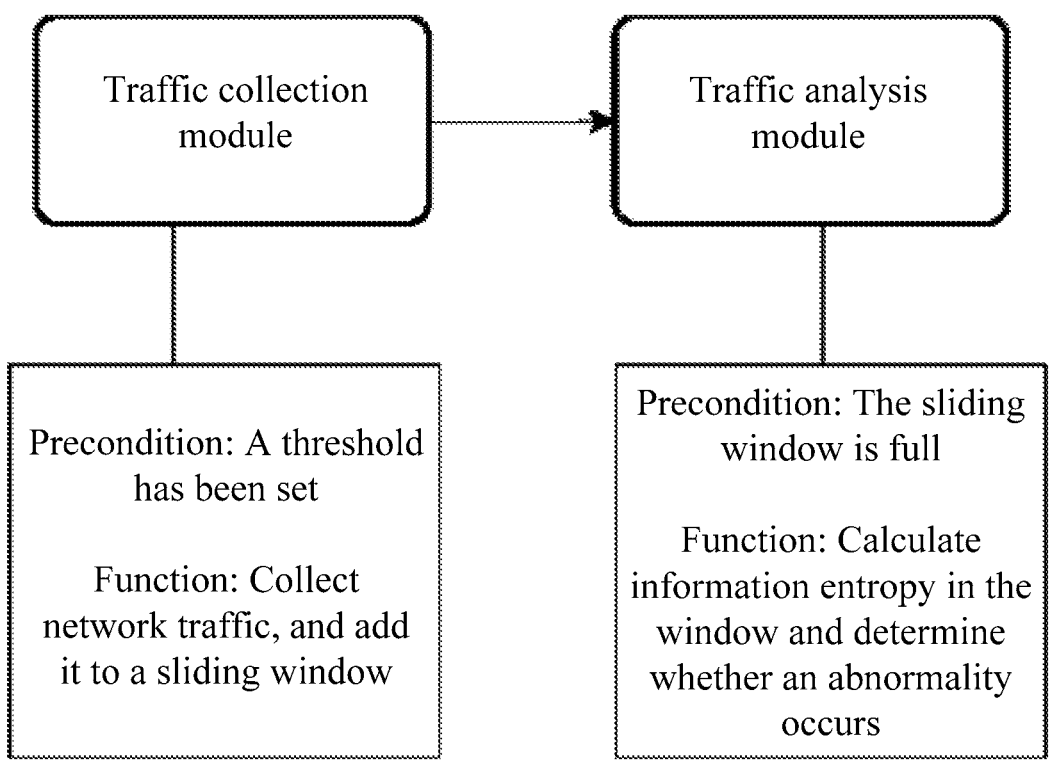
FIG. 2 is a schematic diagram of a system for detecting and defending against abnormal traffic of an in-vehicle network based on information entropy.

The present disclosure will be further described in detail with reference to the following specific embodiment and accompanying drawings. The process, conditions, and experimental methods for implementing the invention disclosure, excluding the content specially mentioned below, are known in the art. The present disclosure imposes no special limitation on the content.

Embodiment

A sliding window with a fixed size is used to separately collect traffic of a CAN bus and an in-vehicle Ethernet, information entropy is calculated for traffic data in the window, and a calculated entropy value is compared with a preset threshold to detect whether an abnormality occurs. If the abnormality occurs, an alarm is sent. Specific steps are as follows:

Step 1: Set the sliding window. A setting rule is as follows:

Step 1.1: Set a maximum tolerable time delay maxTime of abnormality detection, and calculate a traffic rate v, where a size range of the sliding window is $$\left[0, \frac{maxTime}{v}\right],$$

the sliding window needs to be set as large as possible in this range, and the fixed window size is W.

Step 1.2: Set a window sliding distance to W/2.

Step 2: Set the threshold. Specific steps are as follows:

Step 2.1: For the CAN bus, calculate information entropy $CANEntropy_1$, $CANEntropy_2$, ..., and $CANEntropy_n$ in the sliding window under normal traffic for multiple times, and set a minimum value among them as the threshold, namely, $CANThresh=\min\{CANEntropy_1, CANEntropy_2, \ldots, CANEntropy_n\}$.

Step 2.2: For the in-vehicle Ethernet, calculate information entropy $EtherEntropy_1$, $EtherEntropy_2$, ..., and $EtherEntropy_n$ in the sliding window under the normal traffic for multiple times, and set a minimum value among them as the threshold, namely, $EtherThresh=\min\{EtherEntropy_1, EtherEntropy_2, \ldots, EtherEntropy_n\}$.

Step 3: Collect and process traffic. Specific steps are as follows:

Step 3.1: Collect the traffic and add it to the sliding window.

Step 3.2: For the CAN bus, select a packet identifier ID in the window as a discrete random variable, extract the identifier ID in the window to obtain a value range $\{id_1, id_2, \ldots, id_n\}$ of the variable, and take statistics on a count $Count(id_i)$ of an identifier $id_i$ ($1 \leq i \leq n$) appearing in the window.

Step 3.3: For the in-vehicle Ethernet, select a packet protocol type TYPE in the window as a discrete random variable, extract the packet protocol type TYPE in the window to obtain a value range $\{type_1, type_2, \ldots, type_n\}$ of the variable, and take statistics on a count $Count(type_i)$ of a protocol type $type_i$ ($1 \leq i \leq n$) appearing in the window.

Step 4: Calculate the information entropy in the sliding window when the window is full. Specific steps are as follows:

Step 4.1: For the CAN bus, calculate a sampling probability $p_i$ of the packet identifier $id_i$ ($1 \leq i \leq n$) in the window, where $p_i=P\{X=id_i\}=Count(id_i)/W$, and further calculate the information entropy $CANTestEntropy=-\Sigma_{i=1}^{n} p_i \log p_i$.

Step 4.2: For the in-vehicle Ethernet, calculate a sampling probability $p_i$ of the packet protocol type $type_i$ ($1 \leq i \leq n$) in the window, where $p_i=P\{X=type_i\}=Count(type_i)/W$; and further calculate the information entropy $EtherTestEntropy=-\Sigma_{i=1}^{n} p_i \log p_i$.

Step 5: Detect the traffic of the CAN bus and the in-vehicle Ethernet based on the threshold. Specific steps are as follows:

Step 5.1: For the CAN bus, when CANTestEntropy<CANThresh, mark the index of a current window, send an alarm, and slide the window by the distance of W/2 to continue the detection; otherwise, directly slide the window by the distance of W/2 to continue the detection.

Step 5.2: For the in-vehicle Ethernet, when EtherTestEntropy<EtherThresh, mark the index of the current window, send an alarm, and slide the window by the distance of W/2 to continue the detection; otherwise, directly slide the window by the distance of W/2 to continue the detection.

Up to now, the method for performing abnormality detection on internal network traffic of a vehicle in an autonomous driving scenario based on information entropy by using a threshold is performed completely.

The method for detecting and defending against internal abnormal network traffic of a vehicle in an autonomous driving scenario based on information entropy in the present disclosure considers a sharp change of the information entropy due to abnormal traffic, and uses the information entropy to perform abnormality detection. The information entropy in the sliding window is calculated in real time and compared with the preset threshold, to detect whether the abnormality occurs. This implements a security protection scheme for effectively detecting an attack on an in-vehicle network.

The present disclosure is not limited to the described embodiment. Changes and advantages that can be easily figured out by persons skilled in the art without departing the spirit and scope of the present disclosure are included in the present disclosure and subject to the protection scope of the claims.

What is claimed is:

1. A method for detecting and defending against abnormal traffic of an in-vehicle network based on information entropy, wherein different objects are used as discrete random variables for traffic of a controller area network (CAN) bus and an in-vehicle Ethernet; when there is abnormal traffic on the in-vehicle network, probability distribution of the random variables is changed, resulting in a sharp decrease in a value of information entropy; and a threshold is set to determine whether the information entropy is within a reasonable range, thereby implementing abnormality detection for network traffic;

the method comprising:
setting a sliding window;
setting a maximum tolerable time delay maxTime of abnormality detection, and calculating a traffic rate v, wherein a size range of the sliding window is $$\left[0, \frac{maxTime}{v}\right],$$

the sliding window needs to be set as large as possible in this range, and a fixed window size is W; and
setting a window sliding distance to W/2;
setting the threshold;
collecting and processing traffic;
calculating the information entropy in the sliding window when the window is full; and
detecting the traffic of the CAN bus and the in-vehicle Ethernet based on the threshold.

2. The method for detecting and defending against abnormal traffic of an in-vehicle network based on information entropy according to claim 1, wherein the setting the threshold specifically comprises the following:
for the CAN bus, calculating information entropy $CANEntropy_1$, $CANEntropy_2$, ..., and $CANEntropy_n$ in the sliding window under normal traffic for multiple times, and setting a minimum value among them as the threshold, namely, $CANThresh=\min\{CANEntropy_1, CANEntropy_2, \ldots, CANEntropy_n\}$; and
for the in-vehicle Ethernet, calculating information entropy $EtherEntropy_1$, $EtherEntropy_2$, ..., and $EtherEntropy_n$ in the sliding window under the normal traffic for multiple times, and setting a minimum value among them as the threshold, namely, $EtherThresh=\min\{EtherEntropy_1, EtherEntropy_2, \ldots, EtherEntropy_n\}$.

3. The method for detecting and defending against abnormal traffic of an in-vehicle network based on information entropy according to claim 1, wherein the collecting and processing traffic specifically comprises the following:
collecting the traffic and adding it to the sliding window;
for the CAN bus, selecting a packet identifier ID in the window as a discrete random variable, extracting the identifier ID in the window to obtain a value range $\{id_1, id_2, \ldots, id_n\}$ of the variable, and taking statistics on a count $Count(id_i)$ of an identifier $id_i$ ($1 \leq i \leq n$) appearing in the window; and
for the in-vehicle Ethernet, selecting a packet protocol type TYPE in the window as a discrete random variable, extracting the packet protocol type TYPE in the window to obtain a value range $\{type_1, type_2, \ldots, type_n\}$ of the variable, and taking statistics on a count $Count(type_i)$ of a protocol type $type_i$ ($1 \leq i \leq n$) appearing in the window.

4. The method for detecting and defending against abnormal traffic of an in-vehicle network based on information entropy according to claim 1, wherein the calculating the information entropy in the sliding window when the window is full specifically comprises the following:
for the CAN bus, calculating a sampling probability $p_i$ of a packet identifier $id_i$ ($1 \leq i \leq n$) in the window, wherein $p_i = P\{X=id_i\} = Count(id_i)/W$, and further calculating the information entropy $CANTestEntropy = -\Sigma_{i=1}^{n} p_i \log p_i$, wherein $Count(id_i)$ is the count of the identifier $id_i$ ($1 \leq i \leq n$) appearing in the window, W is the fixed window size; and
for the in-vehicle Ethernet, calculating a sampling probability $p_i$ of a packet protocol type $type_i$ ($1 \leq i \leq n$) in the window, wherein $p_i = P\{X=type_i\} = Count(type_i)/W$; and further calculating the information entropy $EtherTestEntropy = -\Sigma_{i=1}^{n} p_i \log p_i$, wherein $Count(type_i)$ is the count of the protocol type $type_i$ ($1 \leq i \leq n$) appearing in the window, W is the fixed window size.

5. The method for detecting and defending against abnormal traffic of an in-vehicle network based on information entropy according to claim 1, wherein the detecting the traffic of the CAN bus and the in-vehicle Ethernet based on the threshold specifically comprises the following:
for the CAN bus, when CANTestEntropy<CANThresh, marking an index of a current window, sending an alarm, and sliding the window by a distance of W/2 to continue the detection; otherwise, directly sliding the window by the distance of W/2 to continue the detection,
wherein CANTestEntropy is the information entropy of the CAN bus dataflow, calculated by the formula $CANTestEntropy = -\Sigma_{i=1}^{n} p_i \log p_i$, and wherein $p_i$ is a sampling probability of a packet identifier $id_i$ ($1 \leq i \leq n$) in the window, calculated by the formula $p_i = P\{X=id_i\} = Count(id_i)/W$, wherein $Count(id_i)$ is the count of the identifier $id_i$ ($1 \leq i \leq n$) appearing in the window, and W is the fixed window size,
wherein CANThresh is the threshold of the information entropy used for abnormal traffic detection on the CAN bus, set as the minimum value among a set of information entropy values obtained in the sliding window under normal CAN bus traffic, and W/2 is the window sliding distance; and
for the in-vehicle Ethernet, when EtherTestEntropy<EtherThresh, marking the index of the current window, sending an alarm, and sliding the window by the distance of W/2 to continue the detection; otherwise, directly sliding the window by the distance of W/2 to continue the detection, wherein EtherTestEntropy is the information entropy of the in-vehicle Ethernet dataflow, calculated by the formula EtherTestEntropy=$-\Sigma_{i=1}^{n} p_i \log p_i$, wherein $p_i$ is a sampling probability of a packet protocol type $type_i$ ($1 \leq i \leq n$) in the window, calculated by the formula $p_i = P\{X = type_i\} = Count(type_i)/W$, wherein $Count(type_i)$ is the count of the protocol type $type_i$ ($1 \leq i \leq n$) appearing in the window, W is the fixed window size, wherein EtherThresh is the threshold of the information entropy used for abnormal traffic detection on the in-vehicle Ethernet, set as the minimum value among a set of information entropy values obtained in the sliding window under normal in-vehicle Ethernet traffic, and W/2 is the window sliding distance.

\* \* \* \* \*